United States Patent [19]
Leung et al.

[11] Patent Number: 5,727,308
[45] Date of Patent: Mar. 17, 1998

[54] THIN FILM MAGNETIC HEAD AND METHOD OF FABRICATION

[75] Inventors: Chak M. Leung, Palo Alto; Charles R. Bond, Milpitas; Daniel A. Nepela, San Jose, all of Calif.

[73] Assignee: Read-Rite Corporation, Milpitas, Calif.

[21] Appl. No.: 684,876

[22] Filed: Jul. 25, 1996

[51] Int. Cl.$^6$ .................... G11B 5/127; G11B 5/39
[52] U.S. Cl. .................... 29/603.14; 29/603.15; 29/603.12; 216/22; 360/113; 360/104; 360/125
[58] Field of Search .................... 29/603.12, 603.14, 29/603.15, 603.07, 603.25; 216/22; 360/103, 104, 113, 114, 122, 123, 125, 126

[56] References Cited

U.S. PATENT DOCUMENTS

| | | | |
|---|---|---|---|
| 4,652,954 | 3/1987 | Church | 360/120 |
| 5,557,492 | 9/1996 | Gill et al. | 360/113 |
| 5,560,097 | 10/1996 | Bajhorek et al. | 29/603.14 X |
| 5,655,286 | 8/1997 | Jones, Jr. | 29/603.13 |

Primary Examiner—W. Donald Bray
Attorney, Agent, or Firm—Nathan N. Kallman

[57] ABSTRACT

A magnetic head is formed by depositing a pad pattern on a substrate with a flat upper surface. The pad pattern includes two spaced inner slopes that face each other. An air bearing surface plane is defined between the inner slopes where the air bearing surface of the magnetic head is to be formed. An undercoat layer is deposited on the pad pattern, such that the undercoat layer follows the contour of the inner slopes to form a recessed region between the inner slopes. A magnetic layer is deposited on the undercoat layer to form a first pole P1 that follows the contours of the inner slopes. A gap layer is then formed on top of the first pole P1 and follows its contour. Conductive coils are formed within the recessed region. A second magnetic layer is deposited over the coils and gap layer to form a second pole P2. The magnetic head is lapped at the air bearing surface plane to form the final air bearing surface.

15 Claims, 2 Drawing Sheets

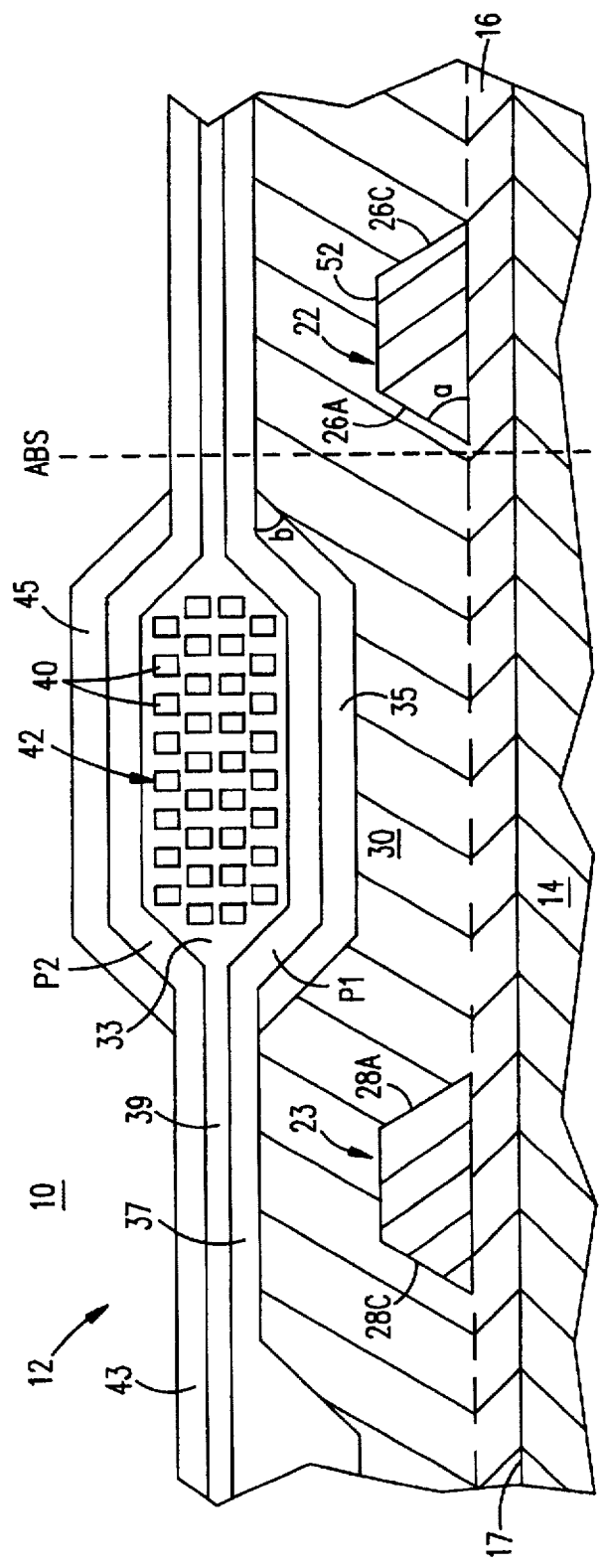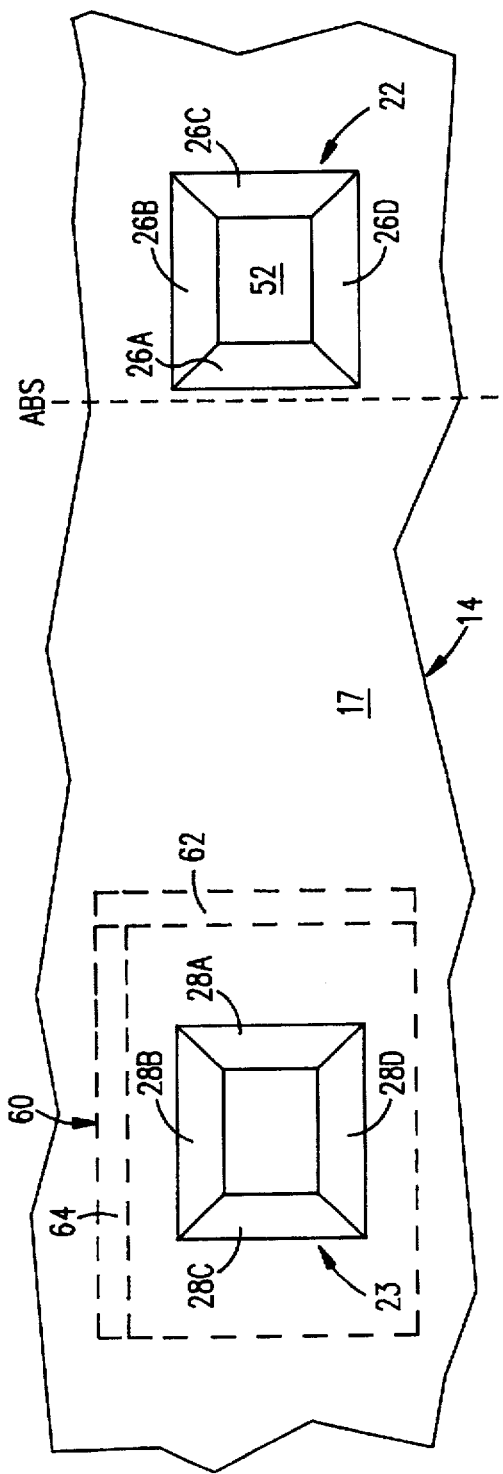
FIG. 1
FIG. 2

THIN FILM MAGNETIC HEAD AND METHOD OF FABRICATION

CROSS-REFERENCE TO COPENDING PATENT APPLICATION

Copending patent application Ser. No. 08/496,299 filed Jun. 29, 1995 on behalf of D. Nepela et al., entitled "Thin Film Magnetic Head With Reduced Undershoot", and assigned to the same assignee, discloses a thin film magnetic transducer that is made of a material of lower permeability than the magnetic pole members. The lower permeability material operates below the Curie point temperature. The copending application is incorporated herein by reference.

FIELD OF THE INVENTION

This invention relates to magnetic heads and in particular to a method for manufacturing a thin film magnetic head that realizes a reduction in readback signal undershoot.

DESCRIPTION OF THE PRIOR ART

In presently known data processing systems, such as disk drives, magnetic heads are used to record data signals. A magnetic head may incorporate an inductive recording transducer for recording signals and a magnetoresistive (MR) element for reading the recorded data. The magnetic head is disposed on an air bearing slider that flies closely above the surface of a recording medium, such as a magnetic disk. Magnetic recording is effectuated by applying current to electrically conductive coil means disposed between two write poles, a leading pole P1 and a trailing pole P2, in the recording head. Readout of the recorded data is achieved with the MR head that senses the magnetic flux representative of the recorded signal.

The trend in disk drive design is toward miniaturization and high performance with fast data seeking and writing time. As a consequence, it is a design objective to minimize the size of the slider and to reduce its flying height. To accommodate these requirements and for the slider to fly close to the disk surface, the throat height of the magnetic head is selected so that optimum data signal processing can be realized. The throat height of all the magnetic heads made during a production run for use with a data storage product must be controlled and maintained within a tightly defined tolerance.

A representative conventional method for producing a magnetic head is described in U.S. Pat. No. 4,281,357 to Lee which describes the step of etching the substrate to form an offset region. In the patented method, an insulator layer is deposited inside the offset region to underlay a bottom thin film magnetic pole. However, there are major obstacles associated with the formation of the offset region. In particular, the slopes of the offset would require precise alignment to maintain the symmetry of the head. Such precise alignment may prove to be difficult to achieve using conventional techniques .such as photolithographic etching. In addition, the formation of the offset region introduces additional manufacturing steps that may reduce yield, increase the likelihood of defects, and render dimensional control difficult to attain. Furthermore, while this patent proposes to form slopes that are less deep compared to those in existing heads, the depth of these slopes is difficult to control particularly during batch fabrication of the magnetic heads.

U.S. Pat. No. 4,281,357 to Lee also describes a method of producing the head by disposing a first insulation layer and a second insulation layer on the substrate in a predetermined spatial relationship in order to define an offset region. However, with reference to FIG. 3 of this patent, as the air bearing surface of the magnetic surface is formed, only part of the insulation layer is lapped, and the remaining insulation material may affect device reliability.

SUMMARY OF THE INVENTION

An object of this invention is to provide a magnetic head, and a simplified fabrication process for defining a cavity within which inductive coils are partly formed, and wherein the angles of the slopes delineating the cavity can be tightly controlled to minimize overlap.

Another object of this invention is to reduce readback signal undershoot signal, thus enhancing operation of the magnetic head.

Another object of this invention is to develop a method for controlling the throat height of the magnetic head with high precision.

In accordance with this invention, a magnetic head is formed by depositing a pad pattern on a substrate with a flat upper surface. The pad pattern includes two inner slopes that are disposed in a spaced relationship facing each other. An air bearing surface (ABS) plane is defined between the inner slopes where the air bearing surface of the magnetic head will ultimately be formed. An undercoat layer is deposited on the pad pattern such that the undercoat layer follows the general contour of the inner slopes in order to form a recessed region between the inner slopes. A layer of magnetic film is applied onto the undercoat layer to form a first pole P1 that also follows the general contour of the inner slopes. A gap layer is then formed on top of the first pole P1 and follows its general contour. An inductive section is then formed by depositing, at least in part, layers of conductive coils within the recessed region. A second layer of magnetic film is deposited over the inductive section and the gap layer to form a second pole P2. The magnetic head is then lapped at the ABS plane to form the final air bearing surface.

In a preferred embodiment, the pad pattern comprises a first pad that includes the first inner slope, and a second pad that includes the second inner slope, such that when the air bearing surface is formed, one of these two pads is removed. The pad pattern may be made of any suitable material, such as a metal, a metal alloy, or a platable material.

In another embodiment, the undercoat layer is made of a low permeability material that contributes to the reduction of readback signal undershoot.

In still another embodiment, the magnetic head includes an intermediate undercoat layer which is deposited directly on the substrate upper surface, such that a pad pattern is formed on the intermediate undercoat layer rather than directly onto the substrate.

BRIEF DESCRIPTION OF THE DRAWING

The invention will be described in greater detail with reference to the drawing in which:

FIG. 1 is a sectional side elevation view of a magnetic head produced according to the present invention, which includes a cavity within which an inductive section is formed;

FIG. 2 is a top plan view of a substrate forming part of the magnetic head of FIG. 1, illustrating two pads formed on the surface of the substrate for defining the slopes delineating the cavity;

Similar numerals refer to similar elements in the drawing. It should be understood that the sizes of the different components in the figures are not necessarily to scale or in exact proportions, and are shown for visual clarity and for the purpose of explanation.

DETAILED DESCRIPTION OF THE INVENTION

Figure 3:
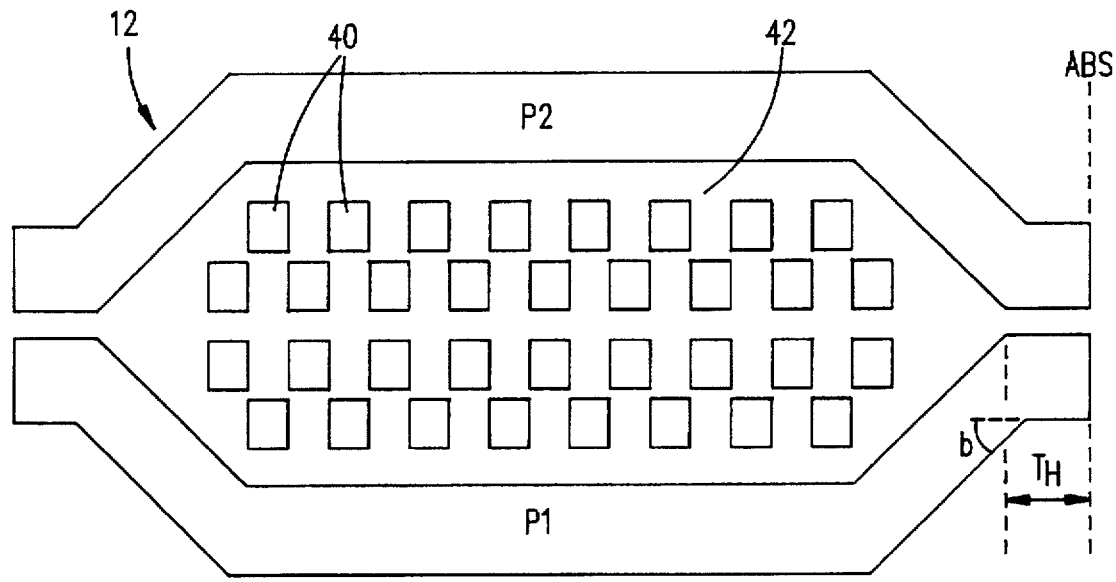
FIG. 3 is an enlarged side view of a portion of the magnetic head of FIG. 1, illustrating the throat height of the magnetic head of FIG. 1.

With reference to FIGS. 1 and 2, a magnetic head 10 includes a thin film inductive write transducer 12. The write transducer 12 includes a substrate 14 made of a nonmagnetic material, such as aluminum oxide/titanium carbide or silicon, or a suitable ceramic material. An intermediate undercoat layer 16, shown in dashed lines in FIG. 1, may optionally be deposited on the entire upper surface 17 of the substrate 14. The intermediate undercoat layer 16 may be an electrically insulating material or low permeability material.

An important feature of the present design is that the upper surface 17 of the substrate 14 is flat and is not etched away to form a recessed region. Instead, a cavity or recessed region is formed on top of the substrate 14 by depositing a pad pattern comprised of two pads 22, 23 on the upper surface 17 of the substrate 14 (FIG. 2), or alternatively on the intermediate undercoat layer 16 (FIG. 1). In this particular embodiment, the two pads 22, 23 are shown to have similar designs for ease of illustration and description. However, it should be clear that alternative embodiments of the invention may include two or more pads of different design and composition.

Pad 22 includes an inner slope 26A that is beveled at a predetermined angle "a" relative to the upper surface 17 of the substrate 14. Similarly, pad 23 includes an inner slope 28 facing the inner slope 26. In this particular example, the pads 22, 23 are made of copper. The inner slopes 26 and 28 are facing each other and are spaced at a predetermined distance.

Another important aspect of the present invention is the positioning of at least one of the pads, such as pad 22, relative to the air bearing surface of the magnetic head 10. The air bearing surface plane is shown as a dashed line and is labeled ABS. It represents the location at which the air bearing surface will ultimately be formed. The ABS plane is located intermediate the two pads 22, 23, such that one of these two pads (in this example pad 22) will be removed by means of a lapping process in order to form the air bearing surface of the magnetic head 10. As a result, it is now possible to obtain better control of the throat height $T_H$, since the apex angle "b" of the throat is not too deep. The throat height $T_H$ and the apex angle "b" are also illustrated in FIG. 3.

Once the pads 22, 23 are formed, the remainder of the head structure is formed on top of the substrate 14 and the pads 22, 23 by conventional techniques, well known in the art. For instance, an insulating undercoat layer 30 is deposited on top of the pads 22, 23 and follows the general contour of the slopes 26, 28 in order to form a recessed region or cavity 33, between the two slopes 26, 28. A thin film 35 of a nickel-iron alloy, such as Permalloy, is deposited within the cavity 33 and overlays the slopes 26, 28. Another layer of magnetic film 37 is applied over the film 35 and the undercoat layer 30 that follows the general contour of the cavity 33 to form the P1 pole yoke. A gap layer 39 of nonmagnetic material is formed on top of the magnetic film 37. Conductive coils 40 are then deposited in part within the recessed region 33, between electrically insulating layers, to form an inductive section 42. A magnetic film 43, made of a nickel-iron alloy, is deposited over the inductive section 42 and the gap layer 39 to define a second pole P2. A layer 45, also made of a nickel-iron alloy, is applied on top of the film 43 in the region covering the inductive section 42, in order to form the P2 pole yoke. Thereafter, the section of the magnetic head 10 to the right of the ABS plane, including the pad 22 is removed so as to form the air bearing surface of the magnetic head 10.

While the pads 22, 23 were described as being made of copper, it should be clear that other metals, metal alloys, or platable materials may be used. The proper selection of such materials will permit the use of large size wafers for forming the air bearing sliders. The use of copper to form the pads 22, 23 is particularly advantageous in that copper is utilized in the fabrication of other parts of the magnetic head 10, and is thus conveniently available during the manufacture process.

In the example illustrated in FIGS. 1 and 2, the pads are generally similar and therefore only the pad 22 will be described in greater detail. The pad 22 includes the inner slope 26, another oppositely and symmetrically disposed slope 50, and a flat upper surface 52. The upper surface 52 is formed by planarizing the pad 22 so as to ensure that the upper surface 52 is parallel to the upper surface 17 of the substrate 14, or alternatively to the upper surface of the intermediate undercoat layer 16.

The angle "a" formed between the slope 26 and the upper surface 17 of the substrate 14, and ultimately the apex angle "b" of the throat can now be controlled with great precision. For instance, after the pads 22, 23 are deposited, it might be desirable to change the inclination of the slope 26, so that the undercoat layer 30 and the overlaying films have an optimal configuration.

This could be achieved using available techniques such as the photoetching process. The angle "a" and the apex angle "b" range between approximately 20 to 60 degrees. In a preferred embodiment the angle "a" is about 45 degrees.

FIG. 2 illustrates an alternative embodiment of the present invention, namely the patterning of the substrate 14 with an appropriate patterned pad 60 shown in dashed lines. Pad 60 may be larger or smaller than pad 23, and may have only one inner slope 62 and one or more inclined sides, such as side 64. Both pads 22 and 23 may have a predetermined patter. In another alternative embodiment, the pads 22, 23 are made of a nonmetallic material and are joined together in a single pattern, such that when the air bearing surface is formed along the ABS plane, no metal is exposed by the removal of the pad 22.

In the present embodiment, the intermediate undercoat layer 16 is about four microns thick. The height of the pads 22, 23, that is the distance between the upper surface 52 and the substrate 14, may range between about 3 to 15 microns, with a preferred range being between 6 an 10 microns. The thickness of the undercoat 30 is about 4 to 12 microns. It should be clear that other dimensions may alternatively be used.

Figure 4:
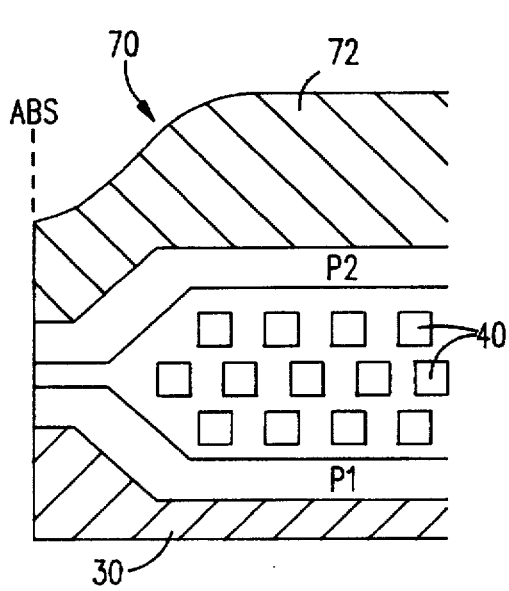
FIG. 4 is a partial sectional view of another embodiment of a magnetic head, made in accordance with this invention, showing the use of low permeability material for reducing readback signal undershoot.

The magnetic head 70 of FIG. 4 is similar to the magnetic head 12, except that the undercoat layer 30 is a low permebility material for reducing readback signal undershoot. Desirable low permeability materials are disclosed in the cross-referenced patent application. When the undercoat layer 30 is composed of a low permeability material, the cavity 33 may be formed within the undercoat layer 30 using conventional techniques. Alternatively, the cavity 33 may be formed using the pad patterning process disclosed herein.

In addition, FIG. 4 illustrates the use of an overcoat layer 72 that overlays, at least in part, the trailing pole P2. The overcoat layer 72 may be composed of any suitable material, including low permeability material. The overcoat layer 72 is patterned so as to effect a significant reduction in readback signal undershoot.

Figure 5:
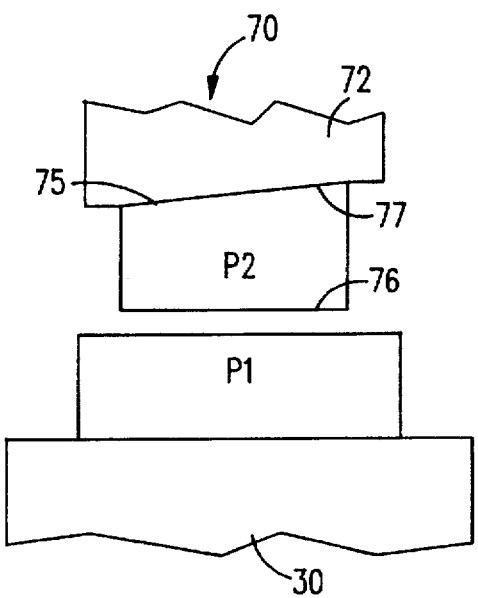
FIG. 5 is an enlarged front view, in part, of the magnetic head of FIG. 4, wherein the trailing edge of pole P2 is raised to reduce signal undershoot.

FIG. 5 is a front view of the magnetic head 70, partly broken away, in which the upper and bottom surfaces 75, 76 of the trailing pole P2 are not parallel in order to selectively reduce readback signal undershoot. As illustrated in this embodiment, the trailing edge 77 of the overcoat layer 72 is raised relative to the leading edge 78 of pole P2.

There has been described herein a thin film magnetic head and a method of making the magnetic head wherein a pad pattern having sloped portions is formed with a recessed region therebetween. The angles of the slopes can be tightly controlled to minimize overlap. Throat height can be precisely controlled. A feature of this invention is that readback signal overshoot is effectively reduced.

What is claimed is:

1. A method of forming a magnetic head comprising the steps of:

providing a substrate with a generally flat upper surface;

depositing a pad pattern on said substrate upper surface, said pad pattern including spaced first and second inner slopes;

defining an air bearing surface plane between said first and second inner slopes, which represents the location at which an air bearing surface is to be formed;

depositing an undercoat layer on said pad pattern, such that said undercoat layer follows the general contour of said first and second inner slopes to form a recessed region between said first and second inner slopes;

forming a first magnetic pole by depositing a first magnetic layer over said undercoat layer such that said first magnetic layer follows the general contour of said inner slopes;

forming a gap layer over said first magnetic layer such that said gap layer follows the general contour of said inner slopes;

depositing conductive coils at least in part within said recessed region;

forming a second magnetic pole by depositing a second magnetic layer over said gap layer; and lapping the magnetic head at said air bearing surface plane to form the air bearing surface.

2. A method according to claim 1, including the step of depositing an intermediate undercoat layer directly on said substrate upper surface; and wherein the step of depositing said pad pattern includes depositing said pad pattern onto said intermediate undercoat layer.

3. A method according to claim 1, wherein said step of depositing a pad pattern on said substrate upper surface includes forming a first pad that includes said first inner slope, and a second pad that includes said second inner slope.

4. A method according to claim 3, wherein said step of lapping includes removing said second pad.

5. A thin film magnetic head comprising:

a substrate with a flat upper surface;

a pad pattern deposited over said substrate upper surface, said pad pattern including spaced first and second inner slopes;

an air bearing surface plane between said first and second inner slopes;

an undercoat layer deposited over said pad pattern, such that said undercoat layer follows the contour of said first and second inner slopes to form a recessed region between said two slopes;

a first magnetic layer formed over said undercoat layer such that said first magnetic layer follows the contour of said inner slopes;

a gap layer formed over said first magnetic layer such that said gap layer follows the contour of said inner slopes;

a conductive coil means disposed within said recessed region;

a second magnetic layer formed over said coil means and said gap layer; and an air bearing surface formed at said air bearing surface plane.

6. A magnetic head according to claim 5, wherein said substrate is made of a nonmagnetic material.

7. A magnetic head according to claim 5, including an intermediate undercoat layer deposited directly on said substrate upper surface; and wherein said pad pattern is formed over said intermediate undercoat layer.

8. A magnetic head according to claim 5, wherein said intermediate undercoat layer is an electrically insulating material.

9. A magnetic head according to claim 5, wherein said first and second inner slopes are beveled at a predetermined angle relative to said substrate upper surface.

10. A magnetic head according to claim 5, wherein said pad pattern includes a first pad that comprises said first inner slope, and a second pad that comprises said second inner slope.

11. A magnetic head according to claim 5, wherein said pad pattern is made of any of a metal or a metal alloy.

12. A magnetic head according to claim 5, wherein said undercoat layer is made of a low permeability material.

13. A magnetic head according to claim 5 including an overcoat layer that overlays, at least in part, said second layer of magnetic film in order to reduce readback signal undershoot.

14. A magnetic head according to claim 13, wherein said overcoat layer is made of a low permeability material.

15. A magnetic head according to claim 5, wherein said second magnetic layer is formed with a leading edge and a trailing edge, and wherein said trailing edge is disposed angularly relative to said leading edge.

* * * * *